US011651425B2

(12) United States Patent
Lack et al.

(10) Patent No.: US 11,651,425 B2
(45) Date of Patent: May 16, 2023

(54) DIGITAL LENDING PLATFORM AND METHODS THEREOF WITH INTEGRATED PRODUCTS, PRICING, AND ELIGIBILITY

(71) Applicant: loanDepot.com, LLC, Foothill Ranch, CA (US)

(72) Inventors: Dino Lack, Foothill Ranch, CA (US); Dominick Marchetti, Foothill Ranch, CA (US)

(73) Assignee: loanDepot.com, LLC, Irvine, CA (US)

( * ) Notice: Subject to any disclaimer, the term of this patent is extended or adjusted under 35 U.S.C. 154(b) by 38 days.

(21) Appl. No.: 16/885,861

(22) Filed: May 28, 2020

(65) Prior Publication Data

US 2020/0380600 A1    Dec. 3, 2020

Related U.S. Application Data

(60) Provisional application No. 62/853,643, filed on May 28, 2019.

(51) Int. Cl.
*G06Q 40/02* (2012.01)

(52) U.S. Cl.
CPC ................. *G06Q 40/025* (2013.01)

(58) Field of Classification Search
CPC ....... G06Q 40/00; G06Q 40/025; G06Q 40/02
See application file for complete search history.

(56) References Cited

U.S. PATENT DOCUMENTS

| 8,065,225 | B1 * | 11/2011 | Lewis, Jr. | G06Q 40/025 705/38 |
| 8,666,879 | B1 * | 3/2014 | Palumbo | G06Q 40/025 705/45 |
| 8,666,885 | B1 * | 3/2014 | Bramlage | G06Q 40/025 705/38 |
| 2001/0047326 | A1 * | 11/2001 | Broadbent | G06Q 40/02 705/37 |
| 2002/0194120 | A1 * | 12/2002 | Russell | G06Q 40/025 705/38 |
| 2011/0282762 | A1 * | 11/2011 | Thomas | G06Q 30/0627 705/26.63 |
| 2017/0186116 | A1 * | 6/2017 | Poll | G06Q 50/167 |
| 2020/0372574 | A1 * | 11/2020 | Sundaram | G06F 16/258 |

* cited by examiner

*Primary Examiner* — Olabode Akintola
*Assistant Examiner* — Paul R Kloberg
(74) *Attorney, Agent, or Firm* — Rutan & Tucker LLP; Hani Z. Sayed; Ravi Mohan

(57) ABSTRACT

Disclosed herein is a digital lending platform with integrated product, pricing, and eligibility. The digital lending platform includes, in some embodiments, one or more server hosts supporting an application stack of the digital lending platform. The application stack includes a loan-product database, a pricing algorithm, and an eligibility rules engine. The loan-product database includes each loan product of a number of loan products offered through the digital lending platform. The pricing algorithm is configured to determine a price for each loan product of the number of loan products. The eligibility rules engine includes eligibility rules for each loan product of the number of loan products. Also disclosed herein is a computer-implemented method of the digital lending platform with the integrated product, pricing, and eligibility.

14 Claims, 6 Drawing Sheets

DIGITAL LENDING PLATFORM AND METHODS THEREOF WITH INTEGRATED PRODUCTS, PRICING, AND ELIGIBILITY

PRIORITY

This application claims the benefit of priority to U.S. Provisional Patent Application No. 62/853,643, filed May 28, 2019, which is incorporated by reference in its entirety into this application.

BACKGROUND

An important financial service provided by financial institutions is lending, which can include originating loans, servicing loans, or both originating and serving loans. There are many different types of loans available through such financial institutions. Broadly, the different types of loans are divided between secured loans and unsecured loans, wherein the secured loans are secured against borrowers' assets. Secured loans include, for example, mortgages, home equity loans, home equity lines of credit, or automotive loans. Unsecured loans include, for example, personal loans, personal lines of credit, student loans, or credit cards.

Lending, particularly originating loans such as mortgages, requires many fragmented, often manual processes of both borrowers and lenders. For a borrower, such processes include filling out a loan application and providing information in support of the loan application, the supporting information including, for example, employment, income, asset, and liability information. For a lender, such processes include processing the borrower's loan application and verifying the supporting information, underwriting a potential loan and performing a detailed risk assessment in view of the supporting information, and, ultimately, upon approval from underwriting, funding the loan. Moreover, such processes are highly specific to loan type. This obviates any financial benefit from economies of scale that could otherwise be passed onto borrowers and lenders alike if such processes were more tightly integrated. Accordingly, there is a need for a more highly automated, more tightly integrated configurable digital lending platform that dissolves lines between lending for secured and unsecured loan types.

Disclosed herein is a digital lending platform with integrated product, pricing, and eligibility and methods thereof in support of at least the foregoing need.

SUMMARY

Disclosed herein is a digital lending platform with integrated product, pricing, and eligibility. The digital lending platform includes, in some embodiments, one or more server hosts supporting an application stack of the digital lending platform. The application stack includes a loan-product database, a pricing algorithm, and an eligibility rules engine. The loan-product database includes each loan product of a number of loan products offered through the digital lending platform. The pricing algorithm is configured to determine a price for each loan product of the number of loan products. The eligibility rules engine includes eligibility rules for each loan product of the number of loan products.

In some embodiments, the pricing algorithm is configured to determine the price for each loan product of the number of loan products in accordance with loan parameters including loan risk, lock term for a locked rate, and interest rate.

In some embodiments, the eligibility rules include rules for minimum credit scores, maximum loan amounts, maximum loan-to-value ratios for loan amounts to assets, or a combination thereof.

In some embodiments, the eligibility rules include rules for loan-level price adjustments.

In some embodiments, the digital lending platform is configured to access the loan-product database, execute the pricing algorithm, and run the eligibility rules engine a number of times for each potential borrower of a number of borrowers depending upon loan-application changes.

In some embodiments, the digital lending platform further includes an administration portal of the application stack provided as a graphical user interface ("GUI") configured for display on a screen of a lender representative's display. The administration portal is configured to display the price for each loan product of the number of loan products, enable any loan product of the number of loan products to be activated or deactivated, enable margins to be managed for each loan product of the number of loan products, or a combination thereof.

In some embodiments, the digital lending platform further includes an automated quality-assurance system of the application stack including automated test-case derivation, eligibility verification, loan-level price-adjustment verification, lock-policy verification, or a combination thereof.

Also disclosed herein is a computer-implemented method of a digital lending platform with integrated product, pricing, and eligibility. The method includes, in some embodiments, instantiating an application stack of the digital lending platform on one or more server hosts; accessing a loan-product database of the application stack including each loan product of a number of loan products offered through the digital lending platform; determining a price for each loan product of the number of loan products with a pricing algorithm of the application stack; and applying eligibility rules for each loan product of the number of loan products with an eligibility rules engine of the application stack.

In some embodiments, determining the price for each loan product of the number of loan products includes determining the price in accordance with loan parameters including loan risk, lock term for a locked rate, and interest rate.

In some embodiments, the eligibility rules include rules for minimum credit scores, maximum loan amounts, maximum loan-to-value ratios for loan amounts to assets, or a combination thereof.

In some embodiments, the eligibility rules include rules for loan-level price adjustments.

In some embodiments, accessing the loan-product database, determining the price for each loan product of the number of loan products, and applying the eligibility rules for each loan product of the number of loan products is performed a number of times for each potential borrower of a number of borrowers depending upon loan-application changes.

In some embodiments, the method further includes providing an administration portal of the application stack as a graphical user interface ("GUI") on a screen of a lender representative's display; and displaying the price for each loan product of the number of loan products, enabling any loan product of the number of loan products to be activated or deactivated, enabling margins to be managed for each loan product of the number of loan products, or a combination thereof in the administration portal.

In some embodiments, the method further includes instantiating an automated quality-assurance system of the application stack. The quality-assurance system includes automated test-case derivation, eligibility verification, loan-level price-adjustment verification, lock-policy verification, or a combination thereof.

These and other features of the concepts provided herein will become more apparent to those of skill in the art in view of the accompanying drawings and following description, which disclose particular embodiments of such concepts in greater detail.

DRAWINGS

DESCRIPTION

Figure 1:
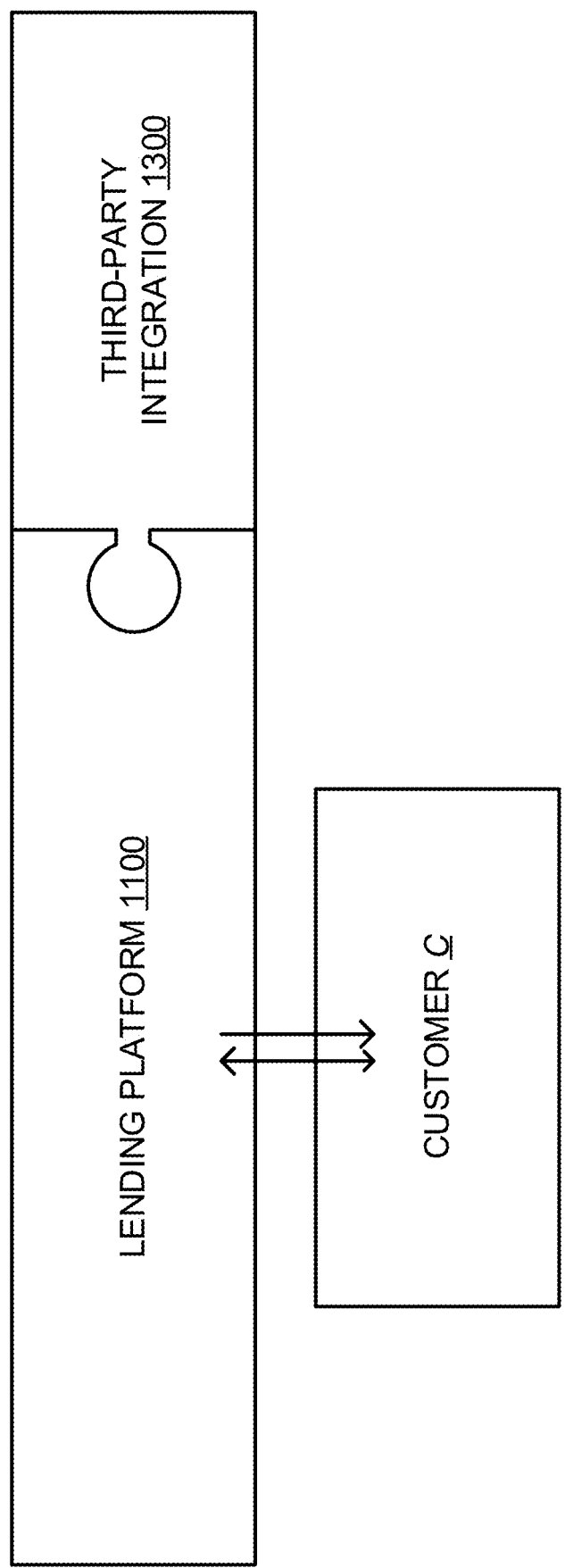
FIG. 1 illustrates a digital lending platform in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," "forward," "reverse," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

Unless defined otherwise, all technical and scientific terms used herein have the same meaning as commonly understood by those of ordinary skill in the art.

As previously set forth, lending requires many fragmented, often manual processes of both borrowers and lenders. Moreover, such processes are highly specific to loan type. This obviates any financial benefit from economies of scale that could otherwise be passed onto borrowers and lenders alike if such processes were more tightly integrated and generalized across the loan types. Accordingly, there is a need for a more highly automated, more tightly integrated, configurable digital lending platform that dissolves lines between lending for secured and unsecured loans.

Disclosed herein is a digital lending platform with integrated product, pricing, and eligibility and methods thereof in support of at least the foregoing need.

For example, a digital lending platform with integrated product, pricing, and eligibility. The digital lending platform includes, in some embodiments, one or more server hosts supporting an application stack of the digital lending platform. The application stack includes a loan-product database, a pricing algorithm, and an eligibility rules engine. The loan-product database includes each loan product of a number of loan products offered through the digital lending platform. The pricing algorithm is configured to determine a price for each loan product of the number of loan products. The eligibility rules engine includes eligibility rules for each loan product of the number of loan products. Also, a computer-implemented method of the digital lending platform with the integrated product, pricing, and eligibility is disclosed.

FIG. 1 illustrates a digital lending platform 1100 in accordance with some embodiments. As shown, the digital lending platform 1100 includes third-party integration 1300, wherein the digital lending platform 1100 is configured for information sharing such that at least a customer C, also known as a potential borrower herein, need not provide duplicative customer information to any systems of the digital lending platform 1100 or any personnel associated therewith. The digital lending platform 1100 is configured for gathering and processing lending-related information for originating loans, servicing loans, or both, wherein the loans are selected from unsecured loans and secured loans. The third-party integration 1300 includes one or more interfaces with the digital lending platform 1100 such as one or more application programming interfaces ("APIs"), one or more web applications, or at least one API and at least one web application. The third-party integration 1300 allows one or more third-parties to at least contribute additional information for the processing of the lending-related information.

Figure 2:
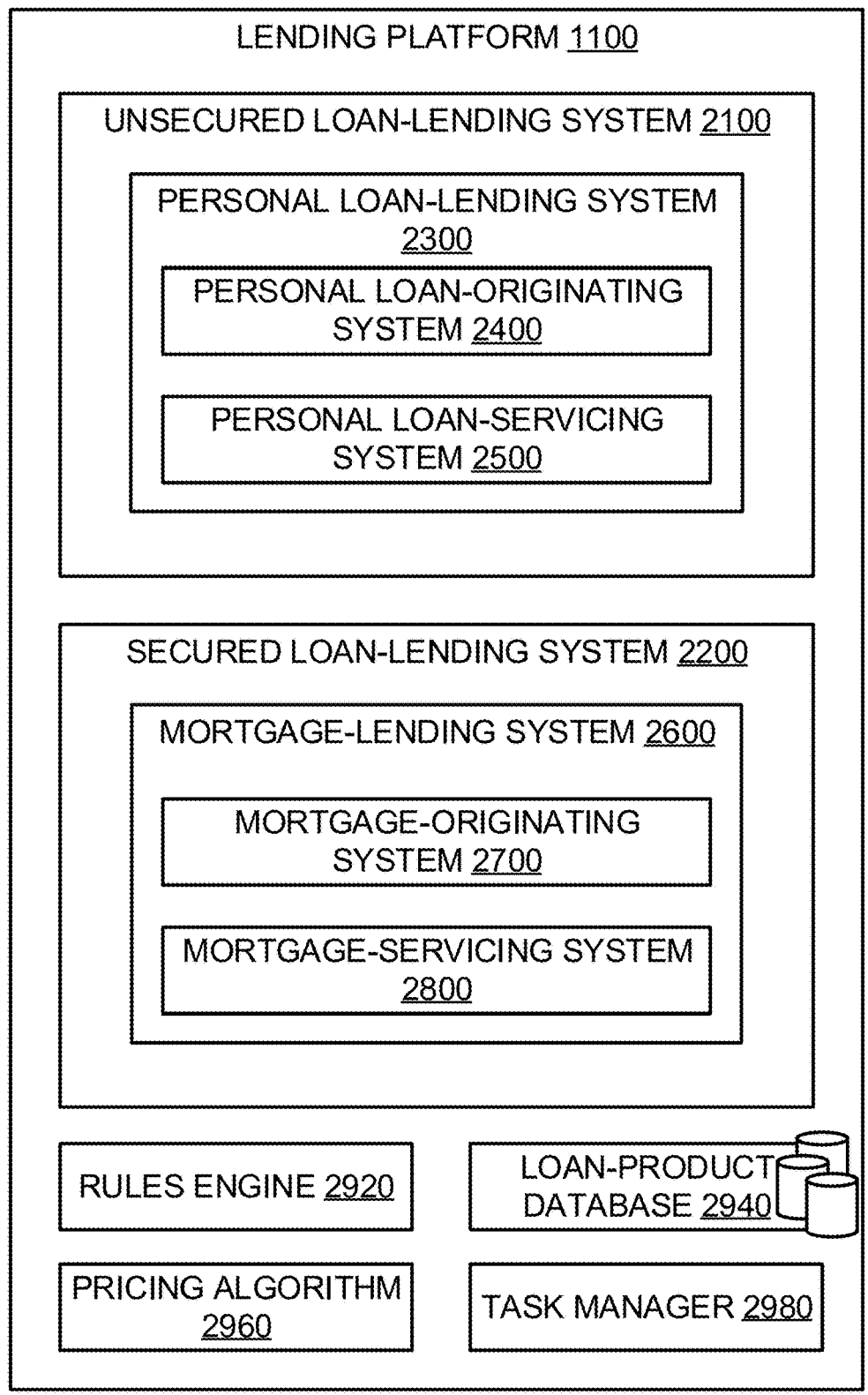
FIG. 2 illustrates the digital lending platform including an unsecured loan-lending system and a secured loan-lending system in accordance with some embodiments.

FIG. 2 illustrates the digital lending platform 1100 including an unsecured loan-lending system 2100 and a secured loan-lending system 2200 in accordance with some embodiments. As shown, the digital lending platform 1100 also includes, in some embodiments, a rules engine 2920, a loan-product database 2940, a pricing algorithm 2960, a task manager 2980, or a combination thereof.

In consideration of personal loans being one type of unsecured loan of many types of unsecured loans, the unsecured loan-lending system 2100 can include a personal loan-lending system 2300 having a personal loan-originating system 2400 and a personal loan-servicing system 2500 as shown. The personal loan-originating system 2400 is configured for originating personal loans. The personal loan-servicing system 2500 is configured for servicing the personal loans. Again, the foregoing is in consideration of personal loans being one type of unsecured loan of many types of unsecured loans. It should be understood the unsecured loan-lending system 2100 can be further configured, or alternatively configured, to support analogous systems for other types of unsecured loans such as personal lines of credit, student loans, or credit cards.

In consideration of mortgages being one type of secured loan of many types of secured loans, the secured loan-lending system 2200 can include a mortgage-lending system 2600 having a mortgage-originating system 2700 and a mortgage-servicing system 2800. The mortgage-originating system 2700 is configured for originating mortgages. The mortgage-servicing system 2800 is configured for servicing the mortgages. Again, the foregoing is in consideration of mortgages being one type of secured loan of many types of secured loans. It should be understood the secured loan-lending system 2200 can be further configured, or alternatively configured, to support analogous systems for other types of secured loans such as home equity loans, home equity lines of credit, or automotive loans.

The rules engine 2920 includes a number of decisioning engines for the digital lending platform 1100 including one or more decisioning engines for the unsecured loan-lending system 2100, one or more decisioning engines for the secured loan-lending system 2200, or both. The rules engine 2920 includes rules for implementing different configurations of the digital lending platform 1100, or portions thereof (e.g., a borrower interface 3530 or a lender interface 3540 of FIG. 3), for loan products of different types, the loan products in different states, and selection of one or more of the loan products by different consumers. The rules engine 2920 can alternatively or additionally include eligibility rules for loan products offered through the digital lending platform 1100, wherein the loan products are either unsecured loans such as personal loans or secured loans such as mortgages. As a separate part of the digital lending platform 1100, the rules engine 2920 facilitates modularity and extensibility without affecting other modules of digital lending platform 1100 such as the unsecured loan-lending system 2100 or the secured loan-lending system 2200.

The loan-product database 2940 includes loan products offered through the digital lending platform 1100, wherein the loan products are either unsecured loans such as personal loans or secured loans such as mortgages.

The pricing algorithm 2960 is configured to determine prices for the loan products offered through the lending platform 1100, wherein the loan products are either unsecured loans such as personal loans or secured loans such as mortgages.

The task manager 2980 is configured to monitor at least running processes of the digital lending platform 1100 by process and group identifiers assigned to the running processes. In addition, the task manager can be configured to schedule priorities for the running processes. For example, the task manager 2980 can be configured to monitor at least running processes for auto-dispositioning financial or personal data for potential borrowers.

The digital lending platform 1100 includes one or more server hosts (see FIG. 5) supporting an application stack having servers, clients, and databases for originating, servicing, or originating and servicing the unsecured loans or the unsecured loans.

Figure 3:
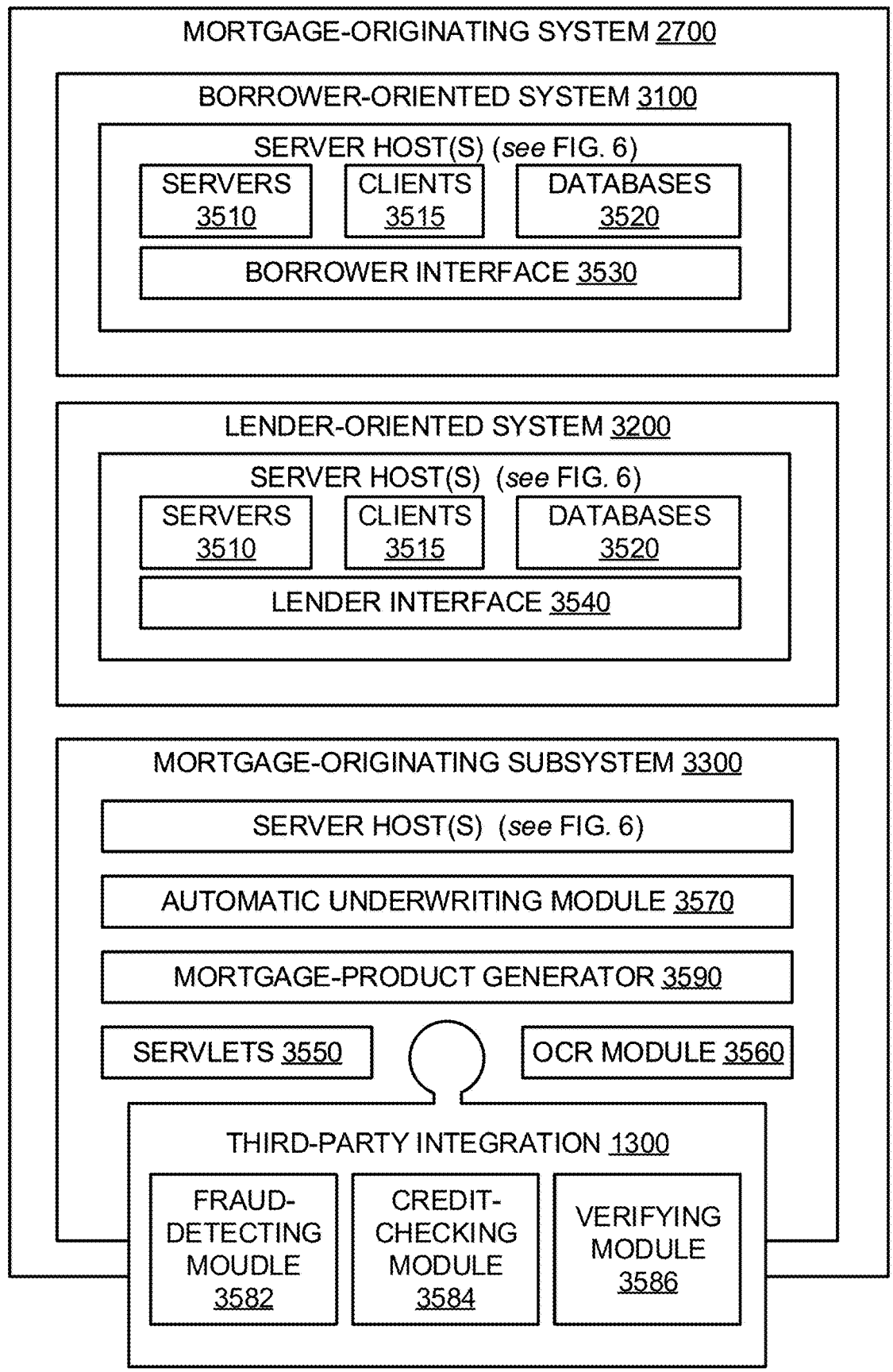
FIG. 3 illustrates a mortgage-originating system of the secured loan-lending system in accordance with some embodiments.

FIG. 3 illustrates the mortgage-originating system 2700 of the secured loan-lending system 2200 in accordance with some embodiments. As shown, the mortgage-originating system 2700 includes a borrower-oriented system 3100, a lender-oriented system 3200, a mortgage-originating subsystem 3300 for at least mortgage-application processing, and third-party integration 1300 supporting mortgage origination.

Figure 5:
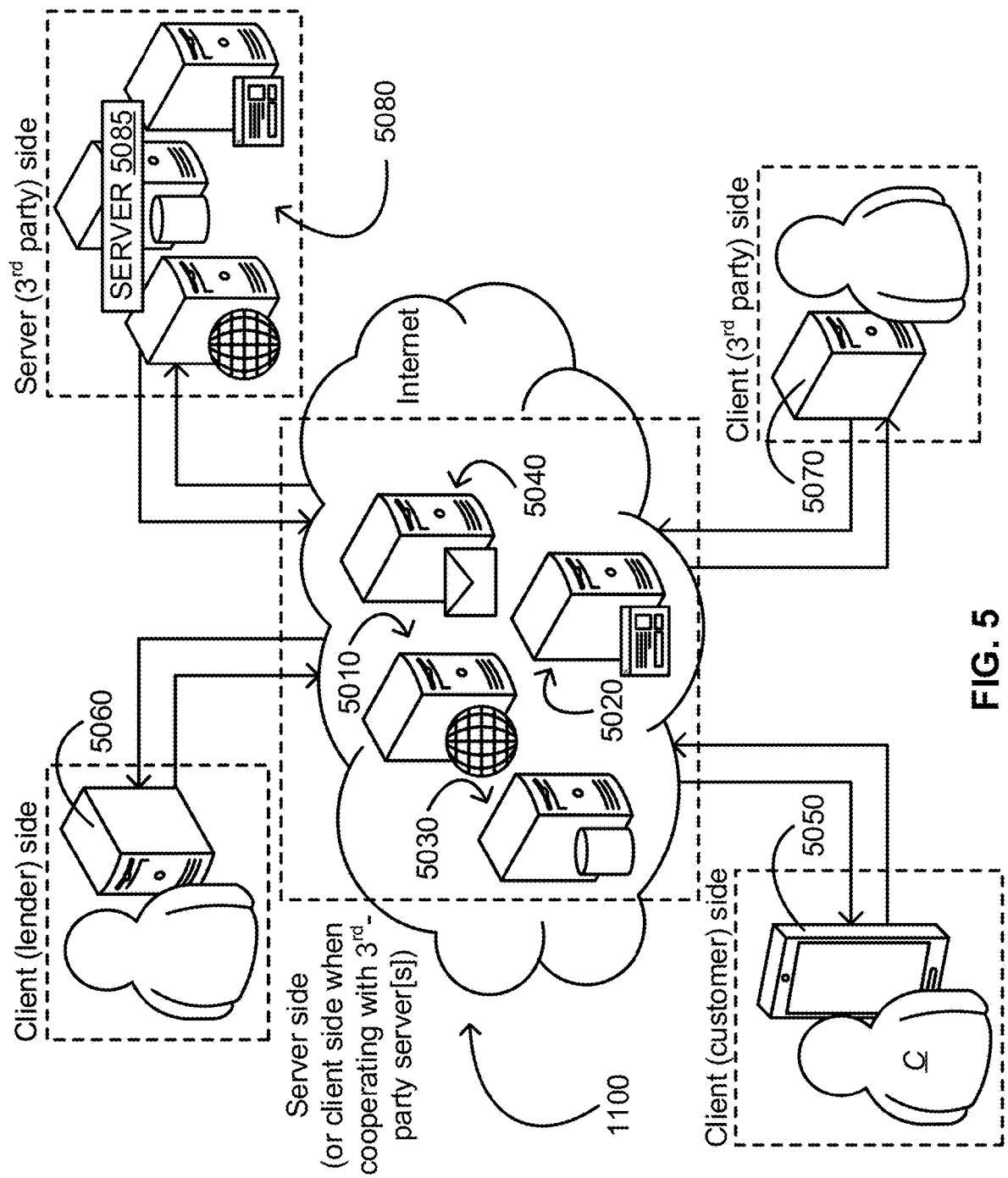
FIG. 5 illustrates the digital lending platform, or the secured loan-lending system thereof, supported by a number of server hosts networked with a number of client hosts in accordance with some embodiments.

Again, the digital lending platform 1100 includes one or more server hosts (see FIG. 5). The one or more server hosts can be shared among at least the borrower-oriented system 3100, the lender-oriented system 3200, and the mortgage-originating subsystem 3300 of the mortgage-originating system 2700. That said, each system of the borrower-oriented system 3100, the lender-oriented system 3200, and the mortgage-originating subsystem 3300 can alternatively or additionally include one or more dedicated server hosts as needed.

The application stack of the digital lending platform 1100 having the servers, the clients, and the databases for originating, servicing, or originating and servicing the unsecured loans or the unsecured loans includes at least a mortgage-originating application having at least a web server, an application server, a database server, a database, and an e-mail server for originating mortgages. The servers and the database for the mortgage-originating system 2700 are respectively shown in FIG. 3 as servers 3510 and databases 3520. Clients 3515 of the mortgage-originating system 2700 for interacting with third-parties in the third-party integration 1300 are also shown in FIG. 3. Each server of the web server, the application server, the database server, and the e-mail server, as well as each client of the clients 3515, is configured to operate at least in part in a primary memory of at least one server host of the one or more server hosts.

The application server is configured to provide at least a web application configured to operate at least in part in a primary memory of a computer system and provide the borrower interface 3530, for example, as a borrower graphical user interface ("GUI") 4000, (see FIG. 4) within a web browser on a screen of a display of the computer system. For example, the application server is configured to provide a mobile web application configured to operate at least in part in a primary memory of a mobile device and present the borrower GUI 4000 within a mobile web browser on a touchscreen of a display of the mobile device. The borrower GUI 4000 is configured to allow potential borrowers to enter borrower-related information into a number of borrower-fillable sections of a digital mortgage application.

Figure 4:
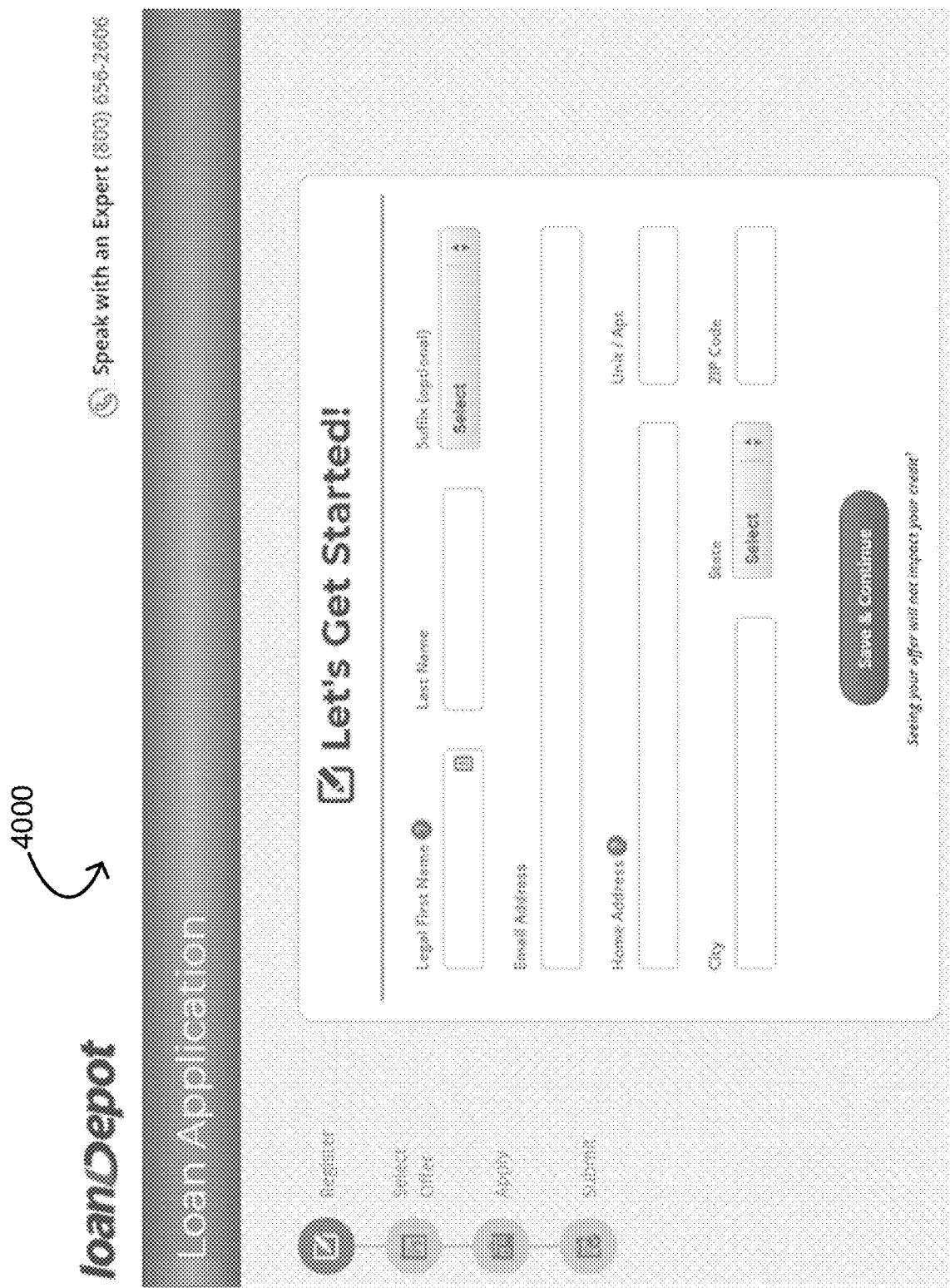
FIG. 4 illustrates a borrower interface of a web application of the unsecured loan-originating system in accordance with some embodiments.

FIG. 4 illustrates the borrower GUI 4000 of the web application of the mortgage-originating system 2700 in accordance with some embodiments.

The number of borrower-fillable sections of the digital application include a borrower-account registration section as shown in FIG. 4, as well as a borrower-profile section, an income-information section, an employment-history section, a banking-information section, or one or more combinations of the foregoing borrower-fillable sections. Such sections are not presented to a potential borrower all at once in order to avoid inundating the potential borrower, as inundating the potential borrower can reduce quality of the borrower-related information provided by the borrow in the number of borrower-fillable sections. Each section of the number of sections is configured to hold the borrower-related information until transferred to the database server and stored in a database of the one or more databases 3520 on a storage device of the at least one server host of the one or more server hosts. As such, a digital mortgage application for a potential borrower can exist in an incomplete state in the database of the one or more databases 3520. Furthermore, the borrower GUI 4000 exemplified in FIG. 4 exists in a borrower-recognizable state corresponding to the incomplete state of the digital mortgage application in the database of the one or more databases 3520. For example, if the potential borrower has finished with the borrower-account registration but has not selected an offer in accordance with the next section of the digital mortgage application as shown in FIG. 4, this is recorded in the database of the one or more databases 3520 and recognized by the potential borrower in the borrower GUI 4000 as a required step for moving to the next section of the digital mortgage application.

Each section of the number of sections of the digital mortgage application optionally includes one or more graphical elements such as an on-screen button (see, for example, button labeled "Save & Continue" in FIG. 4) configured to respectively activate one or more servlets 3550 (see FIG. 3) of the mortgage-originating subsystem 3300 upon activation by a potential borrower. One or more of the servlets 3550 is configured to allow the potential borrowers to upload electronic copies or images of documents selected from at least driver licenses, pay stubs, and bank statements.

In association with the foregoing servlets 3550, the mortgage-originating subsystem 3300 also includes an optical character recognition ("OCR") module 3560 as shown in FIG. 3. The OCR module 3560 is configured to recognize text in uploaded images of documents, extract text from the images, and provide the text by way of the web server for automated filling of the borrower-related information.

Adverting to FIG. 3, the application server is also configured to provide at least a web application configured to operate at least in part in a primary memory of another computer system and provide a lender interface 3540, for example, a lender GUI, within a web browser on a screen of a display of the computer system. For example, the application server is configured to provide a web application configured to operate at least in part in a primary memory of a personal computer and present the lender GUI within a web browser on a screen of a monitor associated with the personal computer. The lender GUI is configured to allow a representative of the lender to review the borrower-related information entered in the number of sections of the digital mortgage application.

The lender GUI is configured to allow the representative of the lender to send secured e-mail messages through the lender GUI by way of the e-mail server with automatic e-mail headers and attachments determined in accordance with a focus in the lender GUI on a particular borrower and loan process step. The secured e-mail messages can solicit additional borrower-related information and direct the potential borrower to one or more pages of a web site or a location in the borrower GUI 4000 to upload electronic copies or images of documents.

The mortgage-originating subsystem 3300 includes an automatic underwriting module 3570 configured to perform detailed risk assessments in view of the borrower-related information transferred to the database server and stored in the one or more databases 3520 on the storage device of the at least one server host of the one or more server hosts. The third-party integration 1300 includes one or more API modules such as a fraud-checking module 3582, credit-checking module 3584, and a verifying module 3586 configured for transferring mortgage-related information between the mortgage-originating subsystem 3300 and third parties such as fraud-detecting companies bureaus, credit bureaus, employment-verification providers, or other third-party vendors.

The mortgage-originating subsystem 3300 can include a mortgage-product generator 3590 configured to generate different mortgage products from which potential borrowers can choose once at least some of the borrower-related information from the digital mortgage application is processed.

FIG. 5 illustrates the digital lending platform 1100, or the secured loan-lending system 2200 thereof, supported by a number of server hosts networked with a number of client hosts in accordance with some embodiments.

As shown in FIG. 5, the server hosts 5010, 5020, 5030, and 5040 can include a web server, an application server, a database server with an associated database, an e-mail server configured to send and receive secured e-mail messages, or a combination thereof. For expository convenience, the server host 5010 is shown to support the web server, the server host 5020 is shown to support the application server, the server host 5030 is shown to support the database server, and the server host 5040 is shown to support the e-mail server; however, the web server, the application server, the database server, and the e-mail server can be supported by any one or more of the server hosts 5010, 5020, 5030, and 5040 in any of a number of ways. Optionally, the server hosts 5010, 5020, 5030, and 5040 further support mobile device-oriented server counterparts such as a mobile web server or a mobile application server if such mobile device-oriented server counterparts are not already integrated with their counterpart servers.

With respect to the mortgage-originating application stack, the application server, which is supported by, for example, the server host 5020, can include a borrower-oriented web application server module (not shown) configured to service requests from one of more client hosts such as a borrower's client host 5050 for a borrower-oriented web application. The borrower-oriented web application server module can be a mobile web application server module configured to service requests from one of more mobile devices (e.g., smart phones, tablet computers, etc.) for a mobile web application version of the borrower-oriented web application. The application server can also include a lender-oriented web application server module (not shown) configured to service requests from one of more client hosts such as a lender's client host 5060 for a lender-oriented web application. The lender-oriented web application server module can be a mobile web application server module configured to service requests from one of more mobile devices (e.g., smart phones, tablet computers, etc.) for a mobile web application version of the lender-oriented web application. The application server can also include a third party-oriented web application server module (not shown) configured to service requests from one of more client hosts such as a third party's client host 5070 for a third party-oriented web application. The third party-oriented web application server module can be a mobile web application server module configured to service requests from one of more mobile devices (e.g., smart phones, tablet computers, etc.) for a mobile web application version of the third party-oriented web application.

While the foregoing sets forth a number of web applications for client hosts, it should be understood that such client hosts can alternatively run local applications native to the operating systems of the client hosts.

Further with respect to the mortgage-originating application stack, a client (e.g., a web-service client) of the clients 3515, which client is supported by, for example, any server host of the server hosts 5010, 5020, 5030, and 5040, can be configured to send financial data, personal data, or the like corresponding to one or more potential borrowers to a server 5085 (e.g., web-service server) of a data-processing service provider 5080, or one or more server hosts thereof, for data processing, data enrichment, etc. The client can also be configured to receive processed data corresponding to the one or more potential borrowers from the server 5085.

Figure 6:
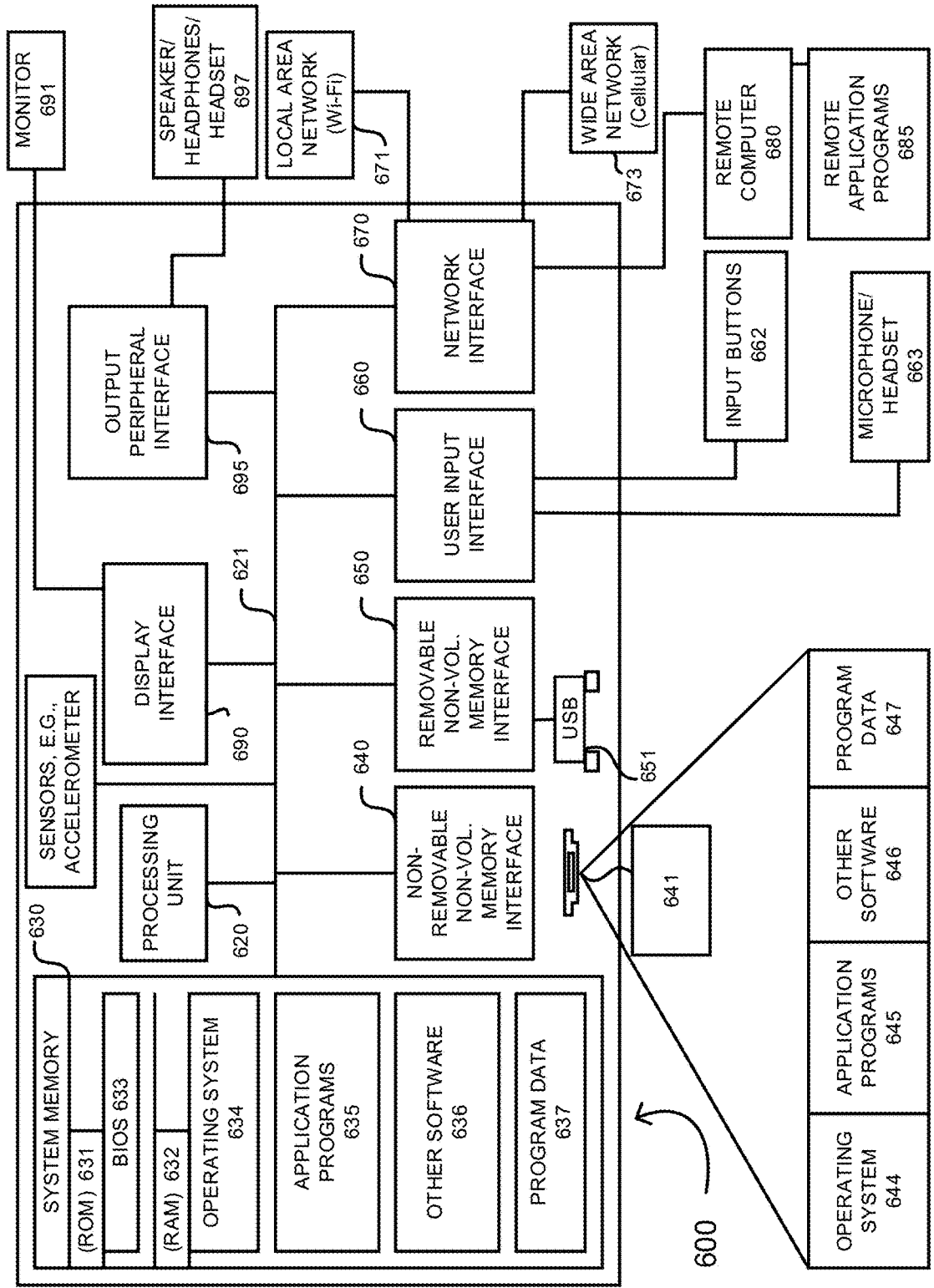
FIG. 6 illustrates components of a network host in accordance with some embodiments.

FIG. 6 illustrates components of a network host 600 such as any one or more server hosts of the digital lending platform 1100, or any client hosts, in accordance with some embodiments. Components of the network host 600 vary in accordance with host type. As such, each and every component shown and described in reference to FIG. 6 need not be included in each host type. Furthermore, each host type can further include components not shown or described in reference to FIG. 6 but otherwise described herein.

As shown, components of the network host 600 can include, but are not limited to, a processing unit 620 having one or more processing cores, a primary or system memory 630, and a system bus 621 that couples various system components including the system memory 630 to the processing unit 620. The system bus 621 can be any of several types of bus structures selected from a memory bus or memory controller, a peripheral bus, and a local bus using any of a variety of bus architectures.

The network host 600 can include a variety of computer-readable media. Computer-readable media can be any media that can be accessed by the network host 600 and includes both volatile and nonvolatile media, as well as removable and non-removable media. By way of example, and not limitation, use of computer-readable media includes storage of information, such as computer-readable instructions, data structures, other executable software, or other data. Computer-readable media includes, but is not limited to, RAM, ROM, EEPROM, flash memory or other memory technology, CD-ROM, digital versatile disks ("DVD") or other optical disk storage, magnetic cassettes, magnetic tape, magnetic disk storage or other magnetic storage devices, or any other tangible medium that can be used to store the desired information for access by the network host 600. Transitory media such as wireless channels are not included in the computer-readable media. Communication media typically embody computer-readable instructions, data structures, other executable software, or other transport mechanisms and includes any information delivery media. As an example, some client hosts on a network might not have optical or magnetic storage.

The system memory 630 includes computer-readable media in the form of volatile or nonvolatile memory such as read only memory ("ROM") 631 and random-access memory ("RAM") 632. A basic input-output system 633 ("BIOS") containing the basic routines that help to transfer information between elements within the network host 600, such as during start-up, is typically stored in ROM 631. RAM 632 typically contains software or data that are immediately accessible for operations by the processing unit 620. By way of example, and not limitation, FIG. 6 illustrates that RAM 632 can include a portion of the operating system 634, application programs 635, other executable software 636, and program data 637.

The network host 600 can also include other computer-readable media. By way of example only, FIG. 6 illustrates a solid-state memory 641. Other computer-readable media that can be used in the example operating environment include, but are not limited to, universal serial bus ("USB") drives and devices, flash memory cards, solid state RAM, solid state ROM, or the like. The solid-state memory 641 is typically connected to the system bus 621 through a non-removable memory interface such as interface 640, and USB drive 651 is typically connected to the system bus 621 by a removable memory interface such as interface 650.

The drives and their associated computer-readable media provide storage of computer-readable instructions, data structures, other executable software, or other data for the network host 600. In FIG. 6, for example, the solid-state memory 641 is illustrated for storing operating system 644, application programs 645, other executable software 646, or program data 647. Note that these components can either be the same as or different from operating system 634, application programs 635, other executable software 636, and program data 637. Operating system 644, application programs 645, other executable software 646, and program data 647 are given different numbers here to illustrate that, at a minimum, they are different copies.

A user can enter commands and information into the network host 600 through input devices such as a keyboard, touchscreen, or software or hardware input buttons 662, a microphone 663, a pointing device such as a mouse, or scrolling input component such as a trackball or touch pad. The microphone 663 can cooperate with speech recognition software. These and other input devices are often connected to the processing unit 620 through a user input interface 660 that is coupled to the system bus 621 but can be connected by other interface and bus structures, such as a parallel port, game port, or USB. A display monitor 691 or other type of display screen device is also connected to the system bus 621 via an interface such as a display interface 690. In addition to the monitor 691, the network host 600 can also include other peripheral output devices such as speakers 697 and other output devices, which can be connected through an output peripheral interface 695.

The network host 600 can operate in a networked environment using logical connections to one or more other network hosts such as network host 680. Like the network host 600, the network host 680 can be a personal computer, a server, a router, a network PC, a peer device, or another network node. The logical connections depicted in FIG. 6 can include a local area network ("LAN") 671 (e.g., Wi-Fi) or a wide area network ("WAN") 673 (e.g., cellular network). Such networking environments are commonplace in offices, enterprise-wide computer networks, intranets, and the Internet. A browser application can be resident on the network host 600 and stored in the memory.

When used in a LAN networking environment, the network host 600 is connected to the LAN 671 through a network interface or adapter 670, which can be, for example, a Bluetooth® or Wi-Fi adapter. When used in a WAN networking environment (e.g., Internet), the network host 600 can include some means for establishing communications over the WAN 673. With respect to telecommunication technologies, for example, a radio interface, which can be internal or external, can be connected to the system bus 621 via the network interface 670, or another appropriate mechanism. In a networked environment, other software depicted relative to the network host 600, or portions thereof, can be stored in the remote memory storage device. By way of example, and not limitation, FIG. 6 illustrates remote application programs 685 as residing on the network host 680. It will be appreciated that the network connections shown are examples and other means of establishing a communications link between the network hosts can be used.

As discussed, the network host 600 can include a processor 620, a memory (e.g., ROM 631, RAM 632, etc.), an AC power input, a display screen, and built-in Wi-Fi circuitry to wirelessly communicate with other network hosts connected to the network.

Another device that can be coupled to the system bus 621 is a power supply such as a DC power supply (e.g., battery) or an AC adapter circuit. As discussed above, the DC power supply can be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied into a non-transitory computer-readable medium. A computer-readable medium includes any mechanism that stores information in a form readable by a computer. For example, a non-transitory machine-readable medium can include ROM; RAM; magnetic disk storage media; optical storage media; flash memory devices; DVDs, EPROMs, EEPROMs, FLASH memory, magnetic or optical cards, or any type of media suitable for storing electronic instructions.

An application described herein includes, but is not limited to, software applications and programs that are part of an operating system or integrated with or on an application layer thereof. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a network host, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

Adverting back to FIG. 2, which illustrates the digital lending platform 1100 having an unsecured loan-lending system and a secured loan-lending system, the digital lending platform 1100 can integrate loan products, pricing for the loan products, and potential-borrower eligibility for the loan products. In such embodiments, the digital lending platform 1100 includes any one or more server hosts of server hosts 5010, 5020, 5030, and 5040 (see FIG. 5 and related description) and an application stack of the digital lending platform 1100 as described in reference to FIG. 2. The application stack includes the loan-product database 2940, the rules engine 2920 configured for potential-borrower eligibility for the loan products, and the pricing algorithm 2960. The digital lending platform 1100 is configured to access the loan-product database 2940, run the rules engine 2920, and execute the pricing algorithm 2960 a number of times for each potential borrower of a number of borrowers depending upon loan-application changes.

The loan-product database 2940 includes each loan product of the loan products offered through the digital lending platform 1100. With respect to secured loans such as mortgages, for example, one loan product of the loan products can be a 30-year fixed-rate mortgage.

The rules engine 2920 includes potential-borrower eligibility rules for each loan product of the loan products. The eligibility rules include rules for minimum credit scores, maximum loan amounts, maximum loan-to-value ratios for loan amounts to assets, or a combination thereof. In some embodiments, the eligibility rules also include rules for loan-level price adjustments.

The pricing algorithm 2960 is configured to determine a price for each loan product of the loan products. The pricing algorithm is configured to determine the price for each loan product of the loan products in accordance with loan parameters including loan risk, lock term for a locked rate, interest rate, or a combination thereof.

The digital lending platform 1100 can further include an administration portal, an automated quality-assurance system, or both as part of the application stack described in reference to FIG. 2. The administration portal is part of the lender interface 3540, which can be provided as GUI configured for display on a screen of a lender representative's display such as the monitor 691 of FIG. 6. The administration portal is configured to display the price for each loan product of the loan products, enable any loan product of the loan products to be activated or deactivated, enable margins to be managed for each loan product of the loan products, or a combination thereof. The automated quality-assurance system of the application stack including automated test-case derivation, eligibility verification, loan-level price-adjustment verification, lock-policy verification, or a combination thereof. Additional details for the quality-assurance system can be found in U.S. Provisional Patent Application No. 62/853,640, filed May 28, 2019, titled INTEGRITY-AND-VOLUME TESTING IN AN UNSECURED LOAN-LENDING SYSTEM INCLUDING METHODS THEREOF, which is hereby incorporated herein by reference in its entirety.

Methods

Non-transitory CRM can include executable instructions that, when executed on one or more server hosts such as the server hosts 5010, 5020, 5030, and 5040 of FIG. 5 by at least an equal number of processors, cause the one or more server hosts to instantiate the digital lending platform 1100 configured to perform a number of operations of the digital lending platform 1100 including the integrated loan products, pricing for the loan products, and potential-borrower eligibility for the loan products.

The operations include instantiating the application stack of the digital lending platform 1100 on any one or more server hosts of the server hosts 5010, 5020, 5030, and 5040, wherein the application stack is that described in reference to FIG. 2; accessing the loan-product database 2940 of the application stack including each loan product of the loan products offered through the digital lending platform 1100; determining a price for each loan product of the loan products with the pricing algorithm 2960 of the application stack; and applying eligibility rules for each loan product of the loan products with the rules engine 2920 of the application stack.

Determining the price for each loan product of the loan products includes determining the price in accordance with loan parameters including loan risk, lock term for a locked rate, and interest rate.

Accessing the loan-product database 2940, determining the price for each loan product of the loan products, and applying the eligibility rules for each loan product of the loan products is performed a number of times for each potential borrower of a number of borrowers depending upon loan-application changes.

The operations can further include providing an administration portal of the application stack as a GUI on a screen of a lender representative's display; and displaying the price for each loan product of the loan products, enabling any loan product of the loan products to be activated or deactivated, enabling margins to be managed for each loan product of the loan products, or a combination thereof in the administration portal.

The operations can further include instantiating an automated quality-assurance system of the application stack. The quality-assurance system includes automated test-case derivation, eligibility verification, loan-level price-adjustment verification, lock-policy verification, or a combination thereof.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A digital lending platform with integrated product, pricing, and eligibility for gathering and processing loan-related data for originating and servicing loans, comprising:
   one or more server hosts configured to support an application stack of the digital lending platform;
   one or more processors communicatively coupled to the one or more server hosts;
   a memory communicatively coupled to the one or more processors, the memory comprising, the application stack, and the application stack comprising:
      a loan-product database configured to facilitate the loan-related data for each loan product of a number of loan products offered through the digital lending platform;
      a pricing algorithm configured to determine a price for each loan product of the number of loan products;
      an eligibility rules engine including eligibility rules for each loan product of the number of loan products, wherein the eligibility rules engine comprises:
      a first decisioning rules engine configured to implement first decisioning rules for an unsecured loan-lending system;
      a second decisioning rules engine configured to implement second decisioning rules for a secured loan-lending system; and
      a plurality of rules implementing one or more configurations with respect to one of a borrower interface and a lender interface;
   a task manager configured to monitor one or more running processes of the application stack, each of the monitored running processes is assigned at least one or more process identifiers and one or more group identifiers, wherein the task manager is configured to:
      (i) schedule priorities for each of the monitored running processes, and
      (ii) auto-disposition financial and personal data for potential consumers in correlation to each of the monitored running processes;
   a third-party integration module configured to support the originating and the servicing loans of the application stack of the digital lending platform, the third-party integration module including one or more application programming interfaces ("APIs") configured to transfer the loan-related data between the unsecured loan-lending system, the secured loan-lending system, and one or more third parties, wherein the APIs of the third party integration module are then configured to receive third-party loan-related verification data from at least one or more of a fraud-detecting provider API, a credit bureau API, and an employment-verification provider API; and
   an automated quality-assurance system configured to perform one or more risk assessments comprising at least an eligibility verification;
   wherein the one or more risk assessments are performed and generated in response to the transferred loan-related data, wherein the automated quality-assurance system is configured to: (i) automatically extract one or more data points from the transferred loan-related data, and (ii) facilitate the one or more third parties in performing at least one or more of a fraud-check, a credit-check, and an employment verification;
   wherein the third-party integration module includes a loan-product generator configured to generate one or more different loan products that may be selected via the borrower interface in response to at least one or more of the performed risk assessments, the transferred loan-related data, the received third-party loan-related verification data, and the automatically extracted data points.

2. The digital lending platform of claim 1, wherein the pricing algorithm is configured to determine the price for each loan product of the number of loan products in accordance with loan parameters including loan risk, lock term for a locked rate, and interest rate.

3. The digital lending platform of claim 1, wherein the eligibility rules include a plurality of first rules associated with at least one or more of minimum credit scores, maximum loan amounts, maximum loan-to-value ratios for loan amounts to assets, and a combination thereof, wherein the eligibility rules comprise a plurality of configuration rules associated with a plurality of user interface configurations in conjunction with the APIs of the third-party integration module, and wherein the plurality of user interface configurations comprises: a first user interface configuration for one or more different types of loan products, a second user interface configuration for loan products in one or more different states, and a third user interface configuration for loan products selected by one or more different consumers.

4. The digital lending platform of claim 3, wherein the eligibility rules include a plurality of second rules associated with loan-level price adjustments, and wherein the plurality of configuration rules comprises: a first set of configuration rules configured to implement the first user interface configuration, a second set of configuration rules configured to implement the second user interface configuration, and a third set of configuration rules configured to implement the third user interface configuration.

5. The digital lending platform of claim 1, wherein the digital lending platform is configured to access the loan-product database, execute the pricing algorithm, and run the eligibility rules engine a number of times for each potential borrower of a number of borrowers depending upon loan-application changes.

6. The digital lending platform of claim 3, further comprising:
an administration portal of the application stack provided as a graphical user interface ("GUI") configured for display on a screen of a lender representative's display, wherein the administration portal is configured to display the price for each loan product of the number of loan products, enable any loan product of the number of loan products to be activated or deactivated, enable margins to be managed for each loan product of the number of loan products, or a combination thereof, and
wherein the administration portal is configured to display the plurality of user interface configurations of the digital lending platform.

7. The digital lending platform of claim 1:
wherein the one or more performed risk assessments of the automated quality-assurance system include at least one or more of an automated test-case derivation, a loan-level price-adjustment verification, a lock-policy verification, and a combination thereof.

8. A computer-implemented method of a digital lending platform with integrated product, pricing, and eligibility for gathering and processing loan-related data for originating and servicing loans, comprising:
instantiating an application stack of the digital lending platform on one or more server hosts;
accessing a loan-product database of the application stack configured to facilitate the loan-related data for each loan product of a number of loan products offered through the digital lending platform;
determining a price for each loan product of the number of loan products with a pricing algorithm of the application stack;
applying eligibility rules for each loan product of the number of loan products with an eligibility rules engine of the application stack, wherein the eligibility rules engine comprises:
a first decisioning rules engine configured to implement first decisioning rules for an unsecured loan-lending system, and a second decisioning rules engine configured to implement second decisioning rules for a secured loan-lending system; and
a plurality of rules implementing one or more configurations with respect to one of a borrower interface and a lender interface;
monitoring one or more running processes of the application stack with a task manager, each of the monitored running processes is assigned at least one or more process identifiers and one or more group identifiers, wherein the task manager is further configured to: (i) schedule priorities for each of the one or more monitored running processes, and (ii) auto-disposition financial and personal data for potential consumers in correlation to each of the monitored running processes;
integrating a third-party integration module to support the originating and the servicing loans of the application stack of the digital lending platform, the third-party integration module including one or more APIs configured to transfer the loan-related data between the unsecured loan-lending system, the secured loan-lending system, and one or more third parties, wherein the APIs of the third party integration module are then configured to receive third-party loan-related verification data from at least one or more of a fraud-detecting provider API, a credit bureau API, and an employment-verification provider API; and
performing one or more risk assessments with an automated quality-assurance system, the one or more risk assessments comprising at least an eligibility verification that is performed and generated in response to the transferred loan-related data, the automated quality-assurance system is configured to: (i) automatically extract one or more data points from the transferred loan-related data, and (ii) facilitate the one or more third parties in performing at least one or more of a fraud-check, a credit-check, and an employment verification; and
wherein the third-party integration module includes a loan-product generator configured to generate one or more different loan products selectable via the borrower interface and in response to at least one or more of the performed risk assessments, the transferred loan-related data, the received third-party loan-related verification data, and the automatically extracted data points.

9. The computer-implemented method of claim 8, wherein determining the price for each loan product of the number of loan products includes determining the price in accordance with loan parameters including loan risk, lock term for a locked rate, and interest rate.

10. The computer-implemented method of claim 8, wherein the eligibility rules include a plurality of first rules associated with at least one or more of minimum credit scores, maximum loan amounts, maximum loan-to-value ratios for loan amounts to assets, or and a combination thereof, wherein the eligibility rules comprise a plurality of configuration rules associated with a plurality of user interface configurations of the digital lending platform, and wherein the plurality of user interface configurations comprises: a first user interface configuration for one or more different types of loan products, a second user interface configuration for loan products in one or more different states, and a third user interface configuration for loan products selected by one or more different consumers.

11. The digital lending platform of claim 10, wherein the eligibility rules include a plurality of first rules associated with at least one or more of minimum credit scores, maximum loan amounts, maximum loan-to-value ratios for loan amounts to assets, and a combination thereof, wherein the eligibility rules comprise a plurality of configuration rules associated with a plurality of user interface configurations in conjunction with the APIs of the third-party integration module, and wherein the plurality of user interface configurations comprises: a first user interface configuration for one or more different types of loan products, a second user interface configuration for loan products in one or more different states, and a third user interface configuration for loan products selected by one or more different consumers.

12. The computer-implemented method of claim 8, wherein accessing the loan-product database, determining the price for each loan product of the number of loan products, and applying the eligibility rules for each loan product of the number of loan products is performed a number of times for each potential borrower of a number of borrowers depending upon loan-application changes.

13. The computer-implemented method of claim 10, further comprising:
   providing an administration portal of the application stack as a graphical user interface ("GUI") on a screen of a lender representative's display; and
   displaying the price for each loan product of the number of loan products, enabling any loan product of the number of loan products to be activated or deactivated, enabling margins to be managed for each loan product of the number of loan products, or a combination thereof in the administration portal, wherein the administration portal is configured to display the plurality of user interface configurations of the digital lending platform.

14. The computer-implemented method of claim 8:
   wherein the one or more performed risk assessments of the automated quality-assurance system include at least one or more of an automated test-case derivation, a loan-level price-adjustment verification, a lock-policy verification, and a combination thereof.

* * * * *